United States Patent Office 3,290,225
Patented Dec. 6, 1966

3,290,225
PROCESS FOR THE RESOLUTION OF D,L-α-METH-YL-β-(3,4-DIHYDROXYPHENYL)-ALANINE INTO ITS OPTICAL ANTIPODES
Erich Rauenbusch and Werner Frommer, Wuppertal-Elberfeld, Germany, assignors, by mesne assignments to Merck & Co., Inc., Rahway, N.J., a corporation of New Jersey
No Drawing. Filed Apr. 20, 1964, Ser. No. 361,276
Claims priority, application Germany, Apr. 26, 1963, F 39,591
3 Claims. (Cl. 195—29)

This invention relates to the production of biologically active L-α-methyl-β-(3,4-dihydroxyphenyl)-alanine from the racemic D,L compound by the action on certain derivatives of suitable bacteria or extracts prepared therefrom.

It is known that DL-α-methyl-β-(3,4-dihydroxyphenyl)-alanine is distinguished by its favorable effects on blood pressure. Due to this valuable property there have been many attempts to produce this compound synthetically. In such syntheses the product is obtained in the form of a racemate which it is desired to separate into its optical antipodes, since the stated useful biological action only appears in the L-form. If the separation of the racemate is omitted, then in the administration of the product the inactive D-form is included as ballast or impurity, which is all the more undesirable as it is in such case necessary to administer the product in relatively large doses.

According to the present invention it has been found possible to resolve the racemate of α-methyl-β-(3,4-dihydroxyphenyl)-alanine into its optical antipodes by causing suitable bacteria or extracts prepared therefrom to act in aqueous medium on derivatives of the formula:

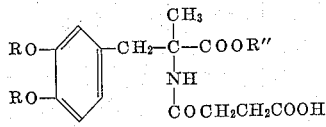

in which R is alkyl of 1 to 4 carbon atoms, and R″ is hydrogen or alkyl of 1 to 4 carbon atoms; separating the resulting free L- or D-amine from remaining D- and L-acylamine, respectively, and splitting off any R or R″ groups which may be present.

For the acylation of the nitrogen, the residues of succinic acid and butyric acid are especially suitable. The process of the invention can, however, also be carried out inter alia with acetic acid, stearic acid, adipic acid, sebacic acid, or trimethylacetic acid derivatives.

It is known that stereospecific resolutions of derivatives of the naturally occurring α-amino acids can be performed with animal or vegetable enzymes [cf. J. P. Greenstein and M. Winitz, "Chemistry of the Aminoacids," vol. 1, page 715; John Wiley & Sons, Inc. 1961, New York and London].

However, all such resolving experiments have failed in the present case, which is to be attributed to the additional and unnatural substitution of the α-C-atom by the methyl group. It was therefore not to be foreseen that by a specific process micro-organisms are to be found which form enzymes which stereo-selectively resolve derivatives of α-methyl-β-(3,4-dihydroxyphenyl)-alanine.

The bacteria suitable for carrying out the process of the invention are found according to the following method: Into sterile culture solutions which contain one percent of one of the dialkoxyacylamine compounds corresponding to the foregoing formula and, besides necessary salts, an inorganic nitrogen source, soil samples of the most varied origin are introduced and incubated on shaking machines at 28° C.

At various intervals samples are taken, in which the deacylated amino compound possibly present is detected chromatographically. After several days, such amino compounds may in fact be detected in individual cultures. Cultures where this occurs contain micro-organisms which are capable of performing a resolution in accordance with the present invention.

These micro-organisms are expediently enriched by carrying out several passages in the same culture solution. In these culture solutions only those micro-organisms can multiply which are suitable for resolution, for only these strains can procure by the resolution, the carbon source necessary for their proliferation. They use for building their cell substance and for respiration only the acyl residue —COCH$_2$CH$_2$COOH; the remaining alkoxy compound is practically unattacked, as has been shown by various experiments, in contrast to the corresponding 3,4-dialkoxyphenyl-alanine compounds.

The enriched cultures in which, by repeated selection, there are found predominantly bacteria of the same strain, are spread on agar culture media. After incubation, individual colonies of typical appearance, taken from those which develop, are inoculated on sloping test tubes.

The bacteria thus found are then employed in a preparative resolution experiment, which determines whether the resolution runs stereoselectively. In the majority of the isolated strains this was the case.

In carrying out this test process, numerous bacteria strains are found. These belong, as shown by electron microscopic experiments of the flagellata type, to the most varied systematic categories. The following strains were found, for example:

| Strain | Flagellata Type | Gram's Stain | Capable of Resolving |
|---|---|---|---|
| SM 12 | Peritrichic | — | Succinic acid. |
| SM 14 | do | — | Do. |
| SM 36 | Polar-monotrichic | — | Do. |
| SM 65 | do | — | Do. |
| SM 81 | do | — | Butyric acid. |
| SM 83 | do | — | Succinic acid. |
| SM 89 | do | — | Do. |
| SM 101 | do | — | Do. |
| SM 102 | do | — | Butyric acid. |
| SM 104 | Polar-multitrichic | — | Do. |
| SM 106 | do | — | Succinic acid. |
| SM 112 | Polar-monotrichic | — | Do. |
| SM 113 | No flagellum | ± | Do. |
| SM 114 | Polar-monotrichic | — | Do. |
| SM 118 | Polar-multitrichic | — | Do. |
| SM 119 | Polar-monotrichic | — | Do. |
| SM 122 | do | — | Do. |

The strains SM 12, SM 24, SM 81 and SM 104 were deposited at the ARS Culture Collection, Northern Utilization Research and Development Division, Peoria, Illinois, U.S.A., under the numbers SM 12=NRRL B-3050, SM 24=NRRL B-3051, SM 81=NRRL B-3052 and SM 104=NRRL B-3053.

The resolution of the N-acyl compounds proceeds relatively slowly if the bacteria are allowed to grow without additional carbon sources, even if they are massively inoculated with a pure culture. It is therefore recommended to speed up the resolution in addition to increasing the growth of the bacteria, by adding a carbon source, e.g. 0.1 to 0.5% glucose or glycerol. The resolution proceeds even faster if the bacteria are allowed to grow without addition of the solution to be resolved, in a complex culture medium for about twenty-four hours, and if only then the compound to be resolved is added. In order to facilitate the working up in this case after resolution, the bacteria can also be centrifuged and after the growth phase washed with water, followed by adding the compound to be resolved to the aqueous bacteria suspension.

The latter method is especially recommended when working with the free 3,4-dihydroxy compounds. These are autoxidizable in neutral to alkaline conditions.

Since the isolation of micro-organisms according to the method described above requires several weeks, these compounds would be completely oxidized. It is, however, possible to use the micro-organisms isolated with the O-alkylated compounds also for resolving the free 3,4-dihydroxy compounds. The bacteria are expediently allowed to grow first, and then the compound to be resolved is added to the concentrated washed and unwashed bacteria suspension, under nitrogen, or with simultaneous acidification to pH 3 to 5, or under nitrogen with simultaneous acidification. It is expedient to use for resolution, compounds which carry the same substituents, e.g. succinyl or butyryl, etc., at the nitrogen and at the two oxygen atoms on the phenyl radical.

The process according to the invention depends upon the fact that the micro-organisms employed only split the one optical antipode of the above-mentioned acylamino compounds. The separation of the one split antipode from the other unsplit optical antipode can proceed by methods generally used, e.g. by extraction with solvents.

The invention is illustrated by the following non-limitative examples.

*Example 1*

An aqueous culture solution, which contains one per cent D,L-N-succinyl-α-methyl-β-(3,4-dimethoxyphenyl)-alanine, 0.2% $KH_2PO_4$, 0.2% $(NH_4)_2SO_4$ and traces of $MgSO_4$, $FeSO_4$ and $CaCO_3$, is adjusted to pH 6.0 with KOH, filtered sterile through glass filter G5, and 200 ml. Erlenmeyer flasks are charged sterile with 50 ml. batches thereof. Altogether 81 flasks were employed and inoculated with 81 soil samples of various origin, some from the neighborhood of Wuppertal, some from South America and some from Africa, by giving each flask one spatula tip-full. The flasks were inoculated on a circular shaking machine at 28° C. On the seventh and twelfth days samples were taken. These were determined chromatographically for the presence of D,L-α-methyl-β-(3,4-dimethoxyphenyl)-alanine. For this purpose, 10μ portions of the sample were placed on chromatographic paper (Schleicher & Schull 2043a or Whatman No. 1), developed for five hours descending in the system n-butanol(4), glacial acetic acid (1), water (1) and stained with triketo-hydrindene (ninhydrin). For α-methyl-β-(3,4-dimethoxyphenyl)-alanine an $R_F$ value of 0.57 to 0.59 was found.

On the seventh day, with two samples, small amounts of the free amino compound were detectable. On the twelfth day, there were formed strongly colored spots on the chromatograms of 2 samples, and on the chromatograms of 2 other samples weakly colored spots which could be attributed to the α-methyl-β-(3,4-dimethoxyphenyl)-alanine. No splitting off of the succinic acid occurred in all the other samples.

To further enrich the bacteria which could perform the splitting, altogether 6 passages in the same medium were made. In each case the individual after-culture was inoculated with 0.1 ml. of the older culture. At intervals of one to three days samples were taken for chromatographic determination of the splitting. As soon as a culture showed observable splitting, a new culture was immediately started. This was the case in the first passages after one to three days, and in the final passages after fourteen to twenty days.

Splitting took place only in 2 of the 4 cultures, viz. in those two which showed in the first enriched culture strongly colored spots on the chromatogram on the twelfth day.

Parallel to the enrichment passages, samples were spread onto plates with Merck standard agar. At first, mixtures of various bacteria were found; after several passages the picture became more uniform. Individual bacteria colonies of typical appearance were taken off and then chromatographically tested again in pure culture for their ability to split succinyl. From the two soils whose first enrichment cultures showed strongly colored spots on the twelfth day on the chromatogram, the strains SM 12 and SM 36 were thus isolated.

In a further batch these two strains were tested in the same culture solution for their ability for stereoselective resolution of D,L-succinyl-α-methyl-β-(3,4-dimethoxyphenyl)-alanine.

Each 100 ml. of the above-mentioned culture solution was inoculated in a 1-liter Erlenmeyer flask, with a platinum wire loop of bacteria culture on standard Merck agar, previously grown, e.g. the strains SM 12 and SM 36, and incubated for sixteen days on the circular shaking machine at 28° C. The bacteria suspensions were then centrifuged at 20,000×g for five minutes, the supernatant phase acidified to pH 1 to 2 and shaken with ethyl acetate four times. The organic phase contains the unsplit succinyl compound which, after evaporating the solvent, was obtained in the form of a crystalline residue.

The aqueous phase was neutralized and freeze-dried. The residue which contains the desired amino acid besides inorganic salts, was incubated with 8 ml. of pyridine and 8 ml. of acetic anhydride for twenty hours at 37° C. The excess amounts of pyridine and acetic anhydride were then removed in a vacuum, the residue taken up in water, adjusted to pH 7 to 7.5, filtered and shaken with ethyl acetate. The aqueous phase was adjusted with concentrated HCl to pH 1 to 2 and shaken four times with ethyl acetate. The organic phase was dried and evaporated, whereby N-acetyl-α-methyl-β-(3,4-dimethoxyphenyl)-alanine was obtained as a crystalline residue. The yields and specific rotations are summarized in Table 1.

TABLE 1

|  | Amount (mg.) | Yield in percent of D,L-N-succinyl compound | $[\alpha]_D^{22}$ methanol c=~1 | Purity of isomer, percent * |
|---|---|---|---|---|
| Recovered N-succinyl compound | 602 | 60 | −10.7 | 61 |
| Yield of amino acid (isolated as N-acetyl derivative) | 202 | 24 | +24.7 | 72 |
| Recovered N-succinyl compound | 710 | 71 | +2.0 |  |
| Yield of amino acid (isolated as N-acetyl derivative) | 132 | 16 | −3.0 |  |

*The optical rotation values of the pure substances are: L-N-succinyl-α-methyl-β-(3,4-dimethoxyphenyl)-alanine, $[\alpha]_D^{22}=-48.1°$; c~1% in methanol. L-N-acetyl-α-methyl-β-(3,4-dimethoxyphenyl)-alanine, $[\alpha]_D^{22}=+56°$; c~1% in methanol.

*Example 2*

An aqueous culture solution, which contains 1% of D,L-N-succinyl-α-methyl-β-(3,4-dimethoxyphenyl)-alanine, 0.2% of $KH_2PO_4$, 0.2% of $(NH_4)_2SO_4$, 0.1% of glycerol, traces of $MgSO_4$ $FeSO_4$ and $CaCO_3$, is adjusted to pH 7.0 with KOH, filtered sterile and a one-liter Erlenmeyer flask is charged with 100 ml. thereof. This Erlenmeyer flask is inoculated with an inoculating wire loop of the strain SM 12 and incubated for ten days at 28° C. on the circular shaking machine. The working up is performed as described in Example 1. The results are shown in Table 2.

TABLE 2

| | Amount (mg.) | Yield in percent of D,L-N-succinyl compound | $[\alpha]_D^{22}$ methanol c=~1 | Purity of isomer, percent * |
|---|---|---|---|---|
| Recovered N-succinyl compound | 323 | 32 | −40.7 | 92 |
| Yield of amino acid (isolated as N-acetyl derivative) | 488 | 59 | +20.5 | 68 |

Example 3

An aqueous culture solution which contains 1% of D,L - N - succinyl - α - methyl - β - (3,4 - dimethoxyphenyl)-alanine, 0.2% of $KH_2PO_4$, 0.2% of $(NH_4)_2SO_4$, 0.2% of glycerol, traces of $MgSO_4$, $FeSO_4$ and $CaCO_3$, is adjusted to pH 7.0 with KOH, filtered sterile and a one-liter Erlenmeyer flask is charged with 100 ml. thereof. This Erlenmeyer flask is inoculated with an inoculating wire loop of the strain SM 24 and incubated for seventeen days on the circular shaking machine at 28° C. The working up proceeds as in Example 1. Table 3 shows the results.

TABLE 3

| | Amount (mg.) | Yield in percent of D,L-N-succinyl compound | $[\alpha]_D^{22}$ methanol c=~1 | Purity of isomer, percent * |
|---|---|---|---|---|
| Recovered N-succinyl compound | 246 | 25 | −43.1 | 95 |
| Yield of amino acid (isolated as N-acetyl derivative) | 338 | 41 | +15.8 | 64 |

Example 4

An aqueous culture solution which contains 1% of D,L - N - succinyl - α - methyl - β - (3,4 - dimethoxyphenyl)-alanine, 0.2% of $KH_2PO_4$, 0.2% of $(NH_4)_2SO_4$, traces of $MgSO_4$, $FeSO_4$ and $CaCO_3$, is adjusted to pH 7.0 with KOH, filtered sterile and a one-liter Erlenmeyer flask is charged with 100 ml. thereof. This Erlenmeyer flask is inoculated with an inoculating wire loop of the strain SM 24 and incubated for twenty-three days on the circular shaking machine at 28° C. The working up proceeds as in Example 1. Table 4 shows the results.

TABLE 4

| | Amount (mg.) | Yield in percent of D,L-N-succinyl compound | $[\alpha]_D^{22}$ methanol c=~1 | Purity of isomer, percent * |
|---|---|---|---|---|
| Recovered N-succinyl compound | 474 | 47 | −9.5 | 60 |
| Yield of amino acid (isolated as N-acetyl derivative) | 152 | 18 | +21.7 | 69 |

Example 5

Two portions of 100 ml. of an aqueous culture solution, which contains 0.15% of rennet Lemco, 0.15% of bacteriocym, 0.4% of casein hydrolyzate, 0.1% of glucose, 0.1% of NaCl, 0.37% of $K_2HPO_4$ and 0.13% of $KH_2PO_4$, are sterilized in a one-liter Erlenmeyer flask for twenty minutes at 120° C., each inoculated with a loop of the strain SM 12 and incubated for forty-eight hours at 28° C. on the circular shaking machine. The bacteria are then centrifuged at 10,000×g, washed three times with 25 ml. each time of sterile distilled water, taken up with 25 ml. of sterile distilled water and then mixed with 50 ml. of a 2% D,L-N-succinyl-α-methyl-β-(3,4-dimethoxyphenyl)-alanine solution and 25 ml. of a phosphate buffer solution (pH 8.0—Sorensen) (eight times concentrated) and further incubated on the circular shaking machine at 28° C. After forty-eight and seventy-two hours, respectively, the flasks are culled and worked up according to Example 1. The results are shown in Table 5.

TABLE 5

| | Incubation time in hours | Amount (mg.) | Yield in Percent of D,L-N-succinyl compound | $[\alpha]_D^{22}$ methanol c=~1 | Purity of isomer, Percent |
|---|---|---|---|---|---|
| Recovered N-succinyl compound | 48 | 560 | 56 | −9.4 | 60 |
| Yield of amino acid (isolated as N-acetyl derivative) | 48 | 388 | 42 | +9.2 | 58 |
| Recovered N-succinyl compound | 72 | 494 | 49 | −21.3 | 72 |
| Yield of amino acid (isolated as N-acetyl derivative) | 72 | 467 | 56 | +15 | 63 |

Example 6

Two portions of 100 ml. of an aqueous culture solution, which contains 0.15% of rennet Lemco, 0.15% of bacteriocym, 0.4% of casein hydrolyzate, 0.1% of glucose, 0.1% of NaCl, 0.37% of $K_2HPO_4$ and 0.13% of $KH_2PO_4$, are sterilized in a one-liter Erlenmeyer flask for twenty minutes at 120° C., each inoculated with a loop of the strain SM 12 and incubated for forty-eight hours at 28° C. on the circular shaking machine. The bacteria are then centrifuged at 10,000×g, washed three times with 25 ml. each time of sterile distilled water, taken up with 25 ml. of sterile distilled water and then mixed with 50 ml. of a 2% D,L-N-succinyl-α-methyl-β-

(3,4-dimethoxyphenyl)-alanine solution and 25 ml. of a phosphate buffer solution (pH 6.0—Sorensen) (eight times concentrated) and further incubated on the circular shaking machine at 28° C. After forty-eight and seventy-two hours, respectively, the flasks are culled and worked up according to Example 1. The results are shown in Table 6.

TABLE 6

|  | Incubation time in hours | Amount (mg.) | Yield in Percent of D,L-N-succinyl compound | $[\alpha]_D^{22}$ methanol c=~1 | Purity of isomer, Percent |
|---|---|---|---|---|---|
| Recovered N-succinyl compound | 48 | 407 | 41 | −23.0 | 74.0 |
| Yield of amino acid (isolated as N-acetyl derivative) | 48 | 348 | 42 | +10.0 | 59 |
| Recovered N-succinyl compound | 72 | 260 | 26 | −42.3 | 94 |
| Yield of amino acid (isolated as N-acetyl derivative) | 72 | 498 | 60 | +15.2 | 64 |

*Example 7*

Two portions of 100 ml. of an aqueous culture solution, which contains 0.15% of rennet Lemco, 0.15% of bacteriocym, 0.4% of casein hydrolyzate, 0.1% of glucose, 0.1% of NaCl 0.37% of $K_2HPO_4$ and 0.13% of $KH_2PO_4$, are sterilized in a one-liter Erlenmeyer flask for twenty minutes at 120° C., each inoculated with a loop of the strain SM 24 and incubated for forty-eight hours at 28° C. on the circular shaking machine. The bacteria are then centrifuged at 10,000×g, washed three times with 25 ml. each time of sterile distilled water, taken up with 25 ml. of sterile distilled water and then mixed with 50 ml. of a 2% D,L-N-succinyl-α-methyl-β-(3,4-dimethoxyphenyl)alanine solution and 25 ml. of a phosphate buffer solution (pH 6.0—Sorensen) (eight times concentrated) and further incubated on the circular shaking machine at 28° C. After forty-eight and seventy-two hours, respectively, the flasks are culled and worked up according to Example 1. The results are shown in Table 8.

TABLE 8

|  | Incubation time in hours | Amount (mg.) | Yield in Percent of D,L-N-succinyl compound | $[\alpha]_D^{22}$ methanol c=~1 | Purity of isomer, Percent |
|---|---|---|---|---|---|
| Recovered N-succinyl compound | 48 | 450 | 45 | −13.3 | 64 |
| Yield of amino acid (isolated as N-acetyl derivative) | 48 | 365 | 44 | +9.2 | 58 |
| Recovered N-succinyl compound | 72 | 392 | 39 | −28.7 | 80 |
| Yield of amino acid (isolated as N-acetyl derivative) | 72 | 421 | 51 | +14.9 | 63 | twenty minutes at 120° C., each inoculated with a loop of the strain SM 24 and incubated for forty-eight hours at 28° C. on the circular shaking machine. The bacteria are then centrifuged at 10,000×g, washed three times with 25 ml. each time of sterile distilled water, taken up with 25 ml. of sterile distilled water and then mixed with 50 ml. of a 2% D,L-N-succinyl-α-methyl-β-(3,4-dimethoxyphenyl)-amine solution and 25 ml. of a phosphate buffer solution (pH 8.0—Sorensen) (eight times concentrated) and further incubated on the circular shaking machine at 28° C. After forty-eight and seventy-two hours, respectively, the flasks are culled and worked up according to Example 1. The results are shown in Table 7.

What is claimed is:

1. A process for the resolution of D,L-α-methyl-β-(3,4-dihydroxyphenyl)-alanine into its optical antipodes which comprises causing bacteria and extracts produced therefrom obtained by adding a compound of the formula

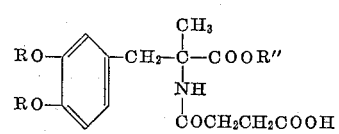

wherein R is alkyl of 1 to 4 carbon atoms and R″ is hydrogen or alkyl of 1 to 4 carbon atoms, as sole carbon source to aqueous culture solutions which, in addition to a nitrogen source, contain necessary salts, suspending therein soil samples containing micro-organisms, and enriching the bacteria which develop therein by repeated passages in the same culture solution, and isolating them

TABLE 7

|  | Incubation time in hours | Amount (mg.) | Yield in Percent of D,L-N-succinyl compound | $[\alpha]_D^{22}$ methanol c=~1 | Purity of isomer, Percent |
|---|---|---|---|---|---|
| Recovered N-succinyl compound | 48 | 539 | 54 | −11.1 | 62 |
| Yield of amino acid (isolated as N-acetyl derivative) | 48 | 329 | 40 | +11.0 | 60 |
| Recovered N-succinyl compound | 72 | 459 | 46 | −17.4 | 68 |
| Yield of amino acid (isolated as N-acetyl derivative) | 72 | 370 | 45 | +15.2 | 64 |

*Example 8*

Two portions of 100 ml. of an aqueous culture solution, which contains 0.15% of rennet Lemco, 0.15% of bacteriocym, 0.4% of casein hydrolyzate, 0.1% of glucose, 0.1% of Nacl, 0.27% of $K_2HPO_4$ and 0.13% of $KH_2PO_4$, are sterilized in a one-liter Erlenmeyer flask for to act in an aqueous medium upon a derivative of the formula

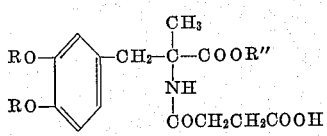

wherein R is alkyl of 1 to 4 carbon atoms, and R'' is hydrogen or alkyl of 1 to 4 carbon atoms, separating free L- and D-amine thus formed from remaining D- and L-acyl-amine, respectively, and splitting off any R'' groups present.

2. A process for the production of cultures with micro-organisms capable of resolving D,L-α-methyl-β-(3,4-dihydroxyphenyl)-alanine into its optical antipodes which comprises introducing soil samples bearing micro-organisms into a sterile culture solution containing about 1 percent of a compound of the formula

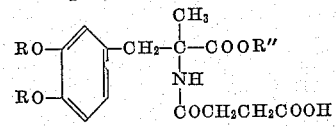

wherein R is alkyl of 1 to 4 carbon atoms and R'' is hydrogen or alkyl of 1 to 4 carbon atoms, salts and a source of inorganic nitrogen, incubating the solution at 28° C. and obtaining individual cultures with micro-organisms of the flagellata-type which are capable of performing the resolution of D,L-α-methyl-β-(3,4-dihydroxylphenyl)-alanine.

3. The process of claim 2, in which the micro-organisms are enriched by several passages in the same culture solution so that only those micro-organisms multiply which are capable of performing the resolution, and increasing the speed of the resolution and the growth of the bacteria by adding about 0.1 to 0.5% of a carbon source selected from the group consisting of glucose and glycerol.

References Cited by the Examiner

Chemical Abstracts, 59, 8871e (October 1963) (abstract of Bel. 620,113, dated Jan. 11, 1963 by Jones R. T. et al.).

A. LOUIS MONACELL, *Primary Examiner.*

L. M. SHAPIRO, *Assistant Examiner.*